(12) United States Patent
Fukamachi

(10) Patent No.: US 6,452,882 B1
(45) Date of Patent: Sep. 17, 2002

(54) METHOD OF COMPENSATING FOR AN ECCENTRICITY OF AN OPTICAL DISC AND APPARATUS FOR DOING THE SAME

(75) Inventor: Mitsuhiro Fukamachi, Gunma (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/626,112

(22) Filed: Jul. 26, 2000

Related U.S. Application Data

(62) Division of application No. 09/073,855, filed on Oct. 16, 1998.

(30) Foreign Application Priority Data

May 7, 1997 (JP) ............................................... 9-117019

(51) Int. Cl.$^7$ ................................................. G11B 7/00
(52) U.S. Cl. .................................. 369/53.14; 369/47.44
(58) Field of Search .............................. 369/50, 32, 54, 369/58, 44.26, 44.32, 47.44, 53.14

(56) References Cited

U.S. PATENT DOCUMENTS

| | | | |
|---|---|---|---|
| 5,384,761 A | | 1/1995 | Hashimoto |
| 5,742,446 A | | 11/1995 | Tian et al. |
| 5,740,356 A | | 4/1998 | Liang et al. |
| 5,808,978 A | * | 9/1998 | Wang et al. ............. 369/44.28 |
| 5,844,866 A | | 12/1998 | Fujimoto et al. |
| 5,844,872 A | | 12/1998 | Kubo et al. |
| 5,926,449 A | | 7/1999 | Hiok et al. |
| 5,936,787 A | | 8/1999 | Ohmi |
| 5,982,725 A | | 11/1999 | Kubo et al. |

FOREIGN PATENT DOCUMENTS

| | | | |
|---|---|---|---|
| JP | 62-109273 | 5/1987 | |
| JP | 62-121938 | 6/1987 | |
| JP | 62-189644 | * 8/1987 | .................. 369/50 |
| JP | 1-184643 | 7/1989 | |
| JP | 1-256045 | 10/1989 | |
| JP | 3-25728 | 2/1991 | |
| JP | 3-269844 | 12/1991 | |
| JP | 4-241261 | 8/1992 | |
| JP | 4-372776 | 12/1992 | |
| JP | 7-161133 | 6/1995 | |
| JP | 8-55422 | 2/1996 | |
| JP | 8-96379 | 4/1996 | |

OTHER PUBLICATIONS

Japanese Office dated Mar. 2, 1999, with partial translation.

* cited by examiner

*Primary Examiner*—Nabil Hindl
(74) *Attorney, Agent, or Firm*—McGinn & Gibb, PLLC

(57) ABSTRACT

There is provided an apparatus for compensating for an eccentricity of an optical disc, including a driver on which an optical disc is mounted for rotation, an optical head for emitting optical beams to the optical disc and receiving optical beams reflected from the optical disc, a mover to which the optical head is secured and which moves in a radius-wise direction of the optical disc, a track cross generating circuit which receives a track error signal from the optical disc and transmits a track cross pulse, and a controller which receives the track cross pulse to thereby determine an eccentricity of the optical disc in view of the optical beams reflected from the optical disc, and controls a rotational frequency of the optical disc in accordance with the thus determined eccentricity. The apparatus provides an advantage that an average transfer rate is increased for the long run.

13 Claims, 5 Drawing Sheets

FIG.4

| ROTATIONAL FREQUENCY OF SPINDLE MOTOR | ECCENTRICITY $\Delta x$ [$\mu m$] |
|---|---|
| 8 × S | 0 – 70 |
| 6 × S | 70 – 105 |
| 4 × S | 105 – 210 |
| 2 × S | 210 – 245 |
| 1 × S | 245 – |

S : STANDARD ROTATIONAL FREQUENCY

METHOD OF COMPENSATING FOR AN ECCENTRICITY OF AN OPTICAL DISC AND APPARATUS FOR DOING THE SAME

The present Application is a Divisional Application of U.S. patent application Ser. No. 09/073,855, filed on May 7, 1998.

BACKGROUND OF THE INVENTION

1. Field of the Invention

The invention relates to an apparatus and a method of determining a rotational frequency of an optical disc for enhancement in a transfer rate.

2. Description of the Related Art

In recent CD-ROM drivers and video disc drivers, there is a need for increasing a rotational frequency of an optical disc up to a rotational frequency in the range of 4,000 rpm to 5,000 rpm. The present standard rotational frequency for CD-ROM driver is about 500 rpm. Hence, if a rotational frequency of an optical disc is gradually increased, an oscillation of a track becomes greater, and accordingly, it is quite difficult or almost impossible to stably draw a track in. In particular, an optical disc having a greater eccentricity tends to oscillate more remarkably.

It is prescribed that an allowable eccentricity of an optical disc is equal to or smaller than 140 $\mu$m. Since a track pitch in an optical disc is about 1.6 $\mu$m, it would be necessary to prepare a device for moving an optical beam spot, which is able to cover an area at least 87.5 times greater than a track pitch (140/1.6=87.5). In addition, when an optical disc is secured to a drive shaft under a certain fitting tolerance, since the drive shaft also has an eccentricity, a total eccentricity would be increased. Accordingly, a servo system for drawing a track therein would be heavily burdened.

The assignee has already suggested a tracking controller in Japanese Unexamined Patent Publication No. 8-96379. This tracking controller satisfies a transfer rate of 140 Mbps which is required for digitally recording incompressive PAL video signals. FIG. 1 illustrates the suggested tracking controller.

An optical head 202 emits a laser beam to an optical disc 201 through a focusing lens 221, and receives a laser beam reflected from the optical disc 201 through the focusing lens 221. The thus received laser beam is introduced to and detected by an optical sensor 222. The optical sensor 222 has a light-receiving plane which is divided into two portions in a track-wise direction of the optical disc 201. The focusing lens 221 is movably supported with an actuator 223.

A subtracting section 203 receives two output signals from the optical sensor 202, and emits a subtraction signal S201 indicative of a difference between the two output signals. An adding section 204 also receives two output signals from the optical sensor 202, and emits an addition signal S205 indicative of a sum of the two output signals.

AGC 205 level-controls the subtraction signal S201 in dependence on the addition signal S205 to thereby absorb a fluctuation in reflectivity of the optical disc 201 for keeping a loop gain constant. An error amplifier 206 compares an output from AGC 205 with a standard input to thereby generate a tracking error signal. A phase compensator 207 gives a suitable frequency-phase characteristic to the tracking error signal. A loop switch 208 operates in response to a tracking start signal S210 emitted from a D-type flip-flop 213. A drive amplifier 209 drives the actuator 223 in accordance with the tracking error signal to thereby cause the laser beam to follow a track.

A relative speed detector 210 is comprised of a binary circuit 101, an edge detecting circuit 102 and a retriggerable monostable multivibrator 103. The relative speed detector 210 monitors a relative speed of the laser beam between a speed in a track-wise direction and a speed in a radius-wise direction of the optical disc. When the relative speed is below a predetermined speed, the relative speed detector 210 emits a speed detecting pulse S204. In other words, the relative speed detector 210 detects a time when the laser beam reaches an intermediate center between a track and a groove of the optical disc 201, and emits the speed detecting pulse S204 when an interval between the detection is longer than a predetermined value. The speed detecting pulse S204 has a predetermined pulse width.

A track detector 211 is comprised of an AC component extracting circuit 111, a binary circuit 112 and a retriggerable monostable multivibrator 113. The track detector 211 monitors a time when the laser beam reaches an edge of a track, based on the addition signal S205, and emits a track detecting pulse S208 having a predetermined pulse width.

The thus generated speed detecting pulse S204 and track detecting pulse S208 are input to an AND circuit 212, which emits a signal S209 indicative of a logical product of the pulses S204 and S208.

The D-type flip-flop 213 receives the signal S209 at a clock input terminal, and also receives a tracking indicating signal S211 at D input terminal, to thereby emit the above-mentioned track start signal S210. Specifically, the D-type flip-flop 213 emits the track start signal S210 just on receipt of the signal S209 when the tracking indicating signal S211 is in H-level, to thereby turn the loop switch 208 on for starting drawing a track in.

The above-mentioned tracking controller illustrated in FIG. 1 can stably draw a track therein under conditions that a rotational frequency of an optical disc is 4500 rpm, an eccentricity of an optical disc is 90 $\mu$m, and a track pitch is 1.2 $\mu$m.

As mentioned earlier, the tracking controller illustrated in FIG. 1 can deal only with an optical disc having an eccentricity of 90 $\mu$m or smaller. However, some optical discs have an eccentricity of 100 $\mu$m or greater. The tracking controller illustrated in FIG. 1 would fail to draw a track therein in such optical discs.

Apart from the apparatus illustrated in FIG. 1, many attempts have been made in order to compensate for an eccentricity of an optical disc, as follows.

Japanese Unexamined Patent Publication No. 62-109273 has suggested an apparatus for compensating for an eccentricity of an optical disc, comprising an eccentricity detector for detecting an eccentricity of an optical disc in view of three signals: an output signal emitted from a pick-up position controller for controlling a pick-up to move in a radius-wise direction of a compact disc; an output signal emitted from a pick-up angle controller for controlling an inclination angle of the pick-up to thereby control a position at which the pick-up reads data out of the compact disc; and a signal indicative of a rotation angle of the compact angle, and a memory for storing an eccentricity of the compact disc detected by the eccentricity detector and reading out an eccentricity about a rotation angle.

Japanese Unexamined Patent Publication No. 62-121938 has suggested a servo system comprising an actuator to which feedback servo is applied in order to keep a position relative to a recording track of a rotary recording medium. The actuator is designed to have a transfer characteristic by which a peak value varies in accordance with an eccentric fundamental wave component of the rotary recording medium.

Japanese Unexamined Patent Publication No. 1-184643 has suggested an apparatus for detecting an eccentricity of an optical disc, comprising an optical head including a lens equipped with an actuator for following a track of an optical disc, a first circuit for emitting a first signal indicative of a gap between the track and the lens, a second circuit for emitting a second signal indicative of a rotational period of the optical disc divided by N wherein N is a positive integer, a third circuit for driving the actuator by a lens drive signal having the same period as that of the second signal, and a fourth circuit for calculating an eccentricity of the track in each half of a period of the lens drive signal by means of the first and second signals.

Japanese Unexamined Patent Publication No. 1-256045 has suggested an apparatus for checking an optical disc, comprising first means for detecting an eccentricity of an optical disc, and second means for switching a tracking servo loop of an actuator. The second means releases the tracking servo loop of the actuator when an eccentricity of an optical disc detected by the first means is below a predetermined value, and closes the tracking servo loop when the detected eccentricity of an optical disc is over the predetermined value.

Japanese Unexamined Patent Publication No. 3-25728 has suggested an apparatus for controlably positioning a track of an optical disc, comprising a low-pass filter for detecting low frequency components of a tracking error signal, a sample holding circuit for sampling the low frequency components of a tracking error signal, with an index pulse, and a driver circuit for driving a linear actuator.

Japanese Unexamined Patent Publication No. 3-269844 has suggested an apparatus for detecting an eccentricity of a recording medium, comprising means for turning a tracking error signal indicative of a positional gap between a track and a beam, into a binary code, and means for counting the binary code signals in synchronization with a revolution of the recording medium.

Japanese Unexamined Patent Publication No. 4-241261 has suggested an apparatus for reproducing data out of an optical disc, comprising first means for detecting an eccentricity of an optical disc while the optical disc is rotating at a low speed, and second means for compensating for the eccentricity of the optical disc. The optical disc is fixed onto a disc clamp after the eccentricity has been compensated for by the second means.

Japanese Unexamined Patent Publication No. 4-372776 has suggested an apparatus for storing data into a magnetic disc. An original data and a copy of the original data are stored into four regions of a disc in such a manner that two regions into which the original data is stored face with each other and remaining two regions into which the copy data is stored face with each other. One of the original data and one of the copy data are stored in the regions having a smaller eccentricity than that of the remaining regions.

SUMMARY OF THE INVENTION

It is an object of the present invention to provide an apparatus and a method of compensating for an eccentricity of an optical disc mounted on a disc driver, to thereby enhance an average transfer rate.

In one aspect of the present invention, there is provided an apparatus for compensating for an eccentricity of an optical disc, including (a) a device for measuring an eccentricity of an optical disc mounted on a driver for rotation, and (b) a device for determining a rotational frequency of the optical disc in dependence on the thus measured eccentricity of the optical disc.

There is further provided an apparatus for compensating for an eccentricity of an optical disc, including (a) a driver on which an optical disc is mounted for rotation, (b) an optical head for emitting optical beams to the optical disc and receiving optical beams reflected from the optical disc, (c) a mover to which the optical head is secured and which moves in a radius-wise direction of the optical disc, and (d) a controller for controlling the mover to move in the radius-wise direction by a desired distance, and for determining an eccentricity of the optical disc in view of the optical beams reflected from the optical disc, and controlling a rotational frequency of the optical disc in accordance with the thus determined eccentricity.

The apparatus may further include a track cross generating circuit which receives a track error signal from the optical disc and transmits a track cross pulse to the controller.

It is preferable that the controller controls the mover to position at such a location that the mover is remote from innermost and outermost tracks of the optical disc by at least a certain distance when an eccentricity of the optical disc is measured. Herein, the certain distance may be defined as a quotient, A/B, wherein A indicates an allowable eccentricity of an optical disc, and B indicates a track pitch of an optical disc.

In another aspect of the present invention, there is provided a method of compensating for an eccentricity of an optical disc, including the steps of (a) measuring an eccentricity of an optical disc mounted on a driver for rotation, and (b) determining a rotational frequency of the optical disc in dependence on the thus measured eccentricity of the optical disc.

There is further provided a method of compensating for an eccentricity of an optical disc, including the steps of (a) rotating an optical disc, (b) measuring an eccentricity of the optical disc, and (c) rotating the optical disc at a rotational frequency determined in accordance with the thus measured eccentricity of the optical disc.

The method may further include the steps of (d) moving the optical disc in a radius-wise direction thereof onto an intermediate track between innermost and outermost tracks of the optical disc when an eccentricity of the optical disc is measured. The step (d) is to be carried out between the steps (a) and (b).

It is preferable that the optical disc is moved remote from innermost and outermost tracks of the optical disc by at least a certain distance in the step (d). For instance, certain distance may be defined as mentioned above.

There is still further provided a method of compensating for an eccentricity of an optical disc, including the steps of (a) loading an optical disc onto a spindle motor, (b) driving the spindle motor to thereby rotate the optical disc, (c) applying focus servo to a laser beam to be emitted to the optical disc without applying tracking servo to the laser beam, (d) moving the optical disc in a radius-wise direction thereof onto an intermediate track between innermost and outermost tracks of the optical disc, (e) producing a track cross pulse signal in accordance with a track error signal transmitted from the optical disc, (f) calculating an eccentricity of the optical disc based on the track cross pulse signal, (g) determining a rotational frequency of the optical disc in accordance with the thus calculated eccentricity, (h) driving the spindle motor so that the optical disc is rotated at the thus determined rotational frequency, and (i) applying tracking servo to the laser beam for reading data out of and writing data into the optical disc.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4 is a list showing a relation between an eccentricity of an optical disc and an allowable rotational frequency of a motor to which the optical disc is secured.

DESCRIPTION OF THE PREFERRED EMBODIMENTS

Figure 1:
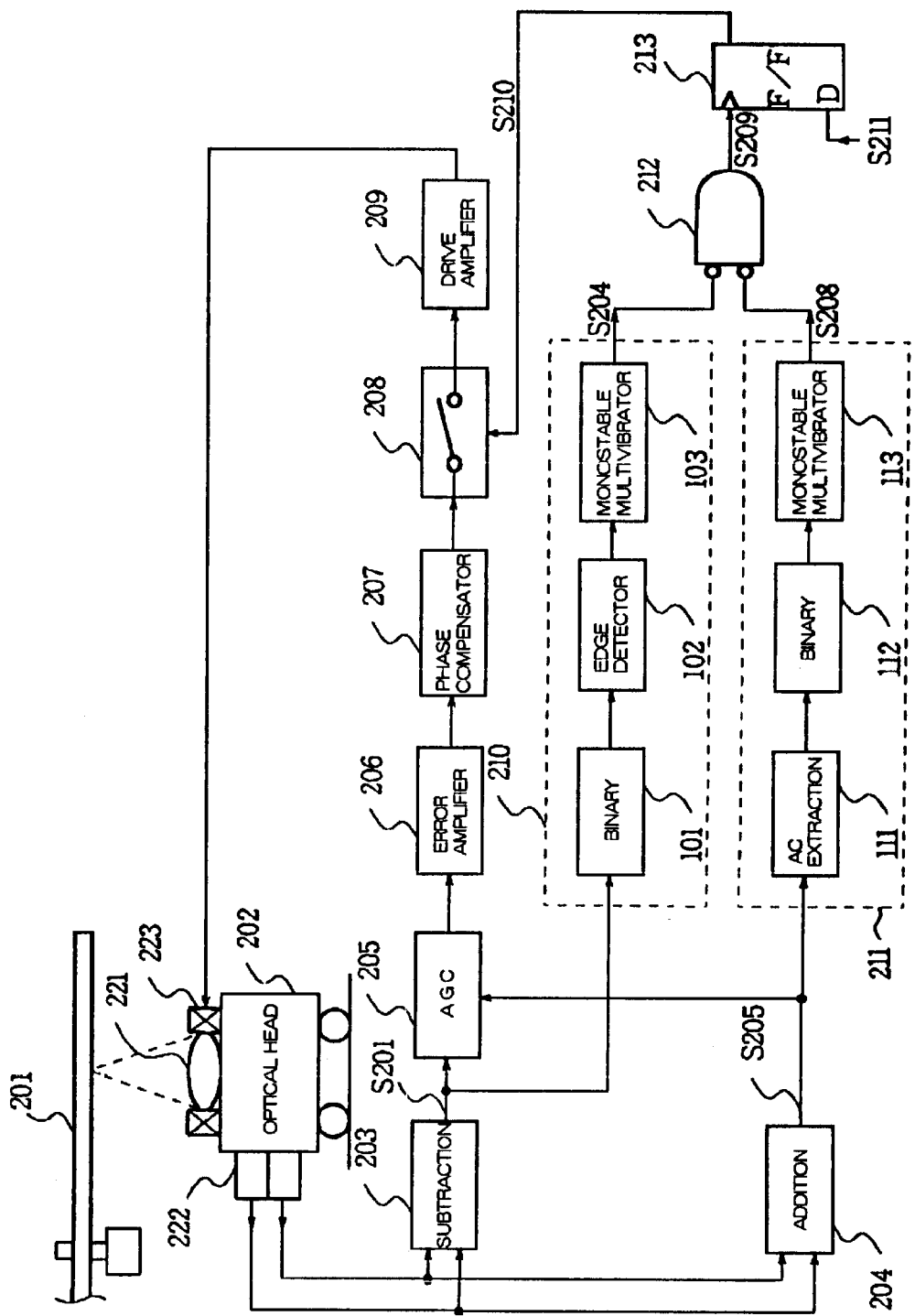
FIG. 1 is a block diagram of a conventional apparatus for compensating for an eccentricity of an optical disc.
Figure 2:
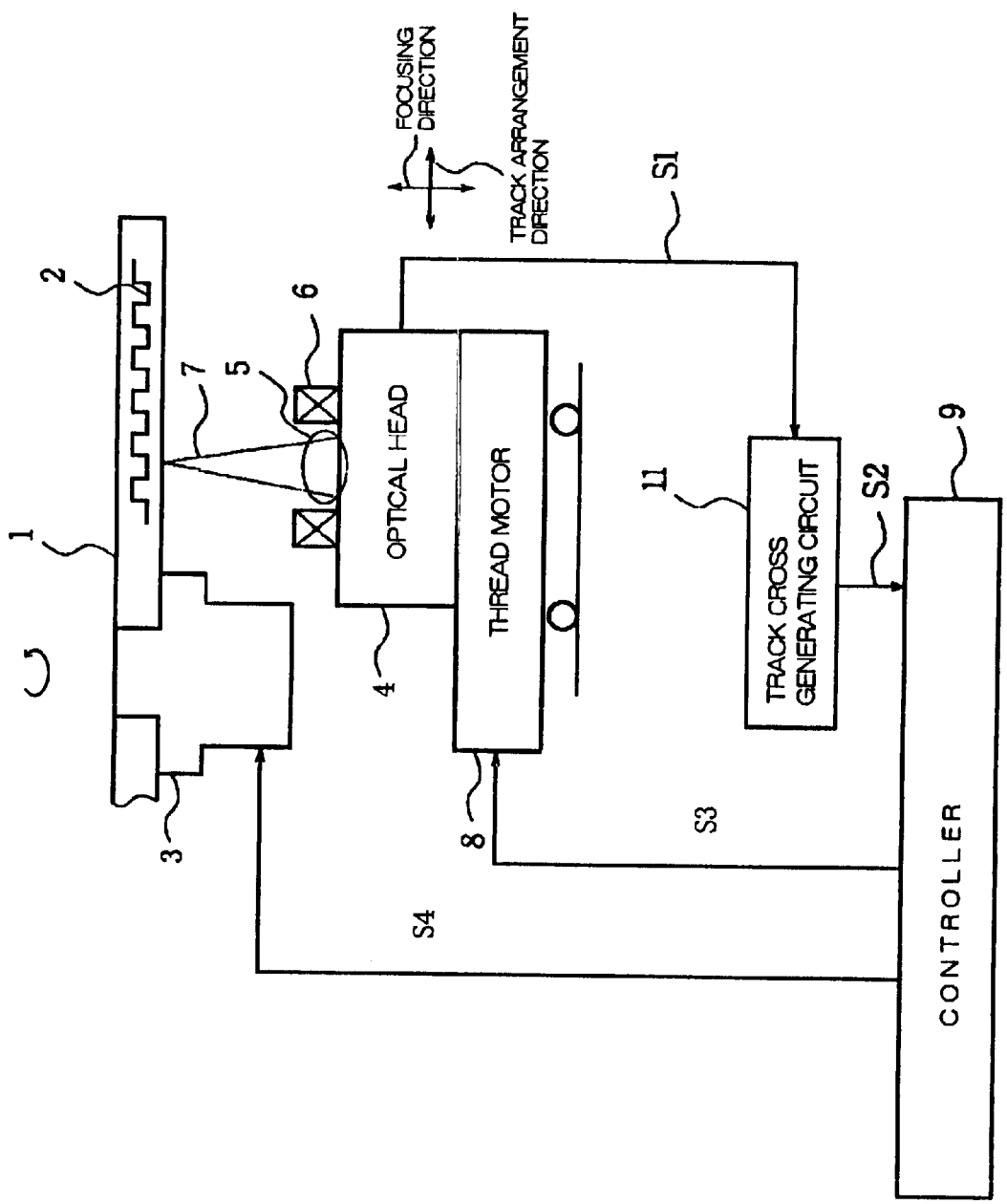
FIG. 2 is a block diagram of an apparatus in accordance with the preferred embodiment of the present invention.

FIG. 2 illustrates an apparatus for compensating an eccentricity of an optical disc, in accordance with the preferred embodiment.

The illustrated apparatus includes a spindle motor 3 to which an optical disc 1 having a plurality of tracks 2 is secured, an optical head 4 for emitting laser beams 7 to the track 2 and receiving laser beams reflected from the track 2, a thread motor 8 to which the optical head 4 is secured for moving the optical head 4 in a radius-wise direction of the optical disc 1 across the tracks 2, a controller 9 determining an eccentricity of the optical disc 1 in view of the laser beams reflected from the optical disc 1, and a track cross generating circuit 11 which receives a track error signal S1 from the optical disc 1 and transmits a track cross pulse S2 to the controller 9.

The optical head 4 is equipped with a lens 5 through which the laser beam is emitted from the optical head 4 to the optical disc 1. The lens 5 is carried at a lens actuator 6 so that the lens 5 is movable relative to the optical head 4.

The controller 9 emits an access indication signal S3 to the thread motor 8 to thereby move the optical head 4 secured to the thread motor 8 in a radius-wise direction of the optical disc 1 across the tracks by a desired distance.

In addition, the controller 9 emits a rotational frequency indicating signal S4 to the spindle motor 3. The spindle motor 3 rotates the optical disc 1 at a rotational frequency indicated with the signal S4.

The controller 9 receives the track cross pulses S2 from the track cross generating circuit 11, and calculates an eccentricity of the optical disc 1 based on the received track cross pulses S2. The controller 9 selects a suitable rotational frequency of the optical disc 1 in accordance with the thus calculated eccentricity of the optical disc 1, and emits the signal S4 indicative of the thus selected rotational frequency to the spindle motor 3 to thereby rotate the optical disc 1 at the thus selected rotational frequency.

The above-mentioned apparatus operates as follows.

After the optical disc 1 was loaded onto the spindle motor 3, the controller 9 emits the signal S4 to drive the spindle motor 3 for rotating the optical disc 1 at a predetermined rotational frequency. For instance, if a standard rotational frequency of the optical disc 1 is 500 rpm, the predetermined rotational frequency is set to be 1,000 rpm.

Then, the controller 9 applies focus servo to the laser beam 7, but does not apply tracking servo to the laser beam 7 at this stage. While the optical disc 1 is rotating, the controller 9 emits the signal S3 to the thread motor 8 to thereby move the optical head 4 at a track remote from innermost and outermost tracks of the optical disc 1. As mentioned earlier, an eccentricity of the optical disc 1 is equal to or greater than 87.5×X wherein X indicates a track pitch. Hence, a track to which the optical head 4 is moved is selected as a track which is remote from an innermost track by at least 88 tracks and is also remote from an outermost track by at least 88 tracks. Otherwise, it might be impossible to detect an eccentricity of the optical disc 1 by utilizing an intensity of the laser beam reflected from the tracks 2 when the laser beam to which tracking servo is not applied scans across the tracks 2.

Then, the optical head 4 receives the laser beam reflected from the optical disc 1, and emits the track error signals S1 to the track cross generating circuit 11. The track cross generating circuit 11 generates the track cross pulses S2 based on the received track error signals S1, and emits the thus generated track cross pulses S2 to the controller 9.

The controller 9 calculates an eccentricity of the optical disc 1 based on the received track cross pulses S2, and then, selects a suitable rotational frequency of the spindle motor 3 based on the thus calculated eccentricity of the optical disc 1. Then, the controller 9 emits the signal S4 indicative of the thus selected rotational frequency, to the spindle motor 3 to thereby rotate the optical disc 1 at the selected rotational frequency.

Then, tracking servo is applied to the laser beam 7 for reading data out of and writing data into the optical disc 1.

Thus, the optical disc 1 is rotated at a rotational frequency determined in dependence on an eccentricity of the optical disc 1, ensuring enhancement of an average transfer rate for the long run.

Figure 3:
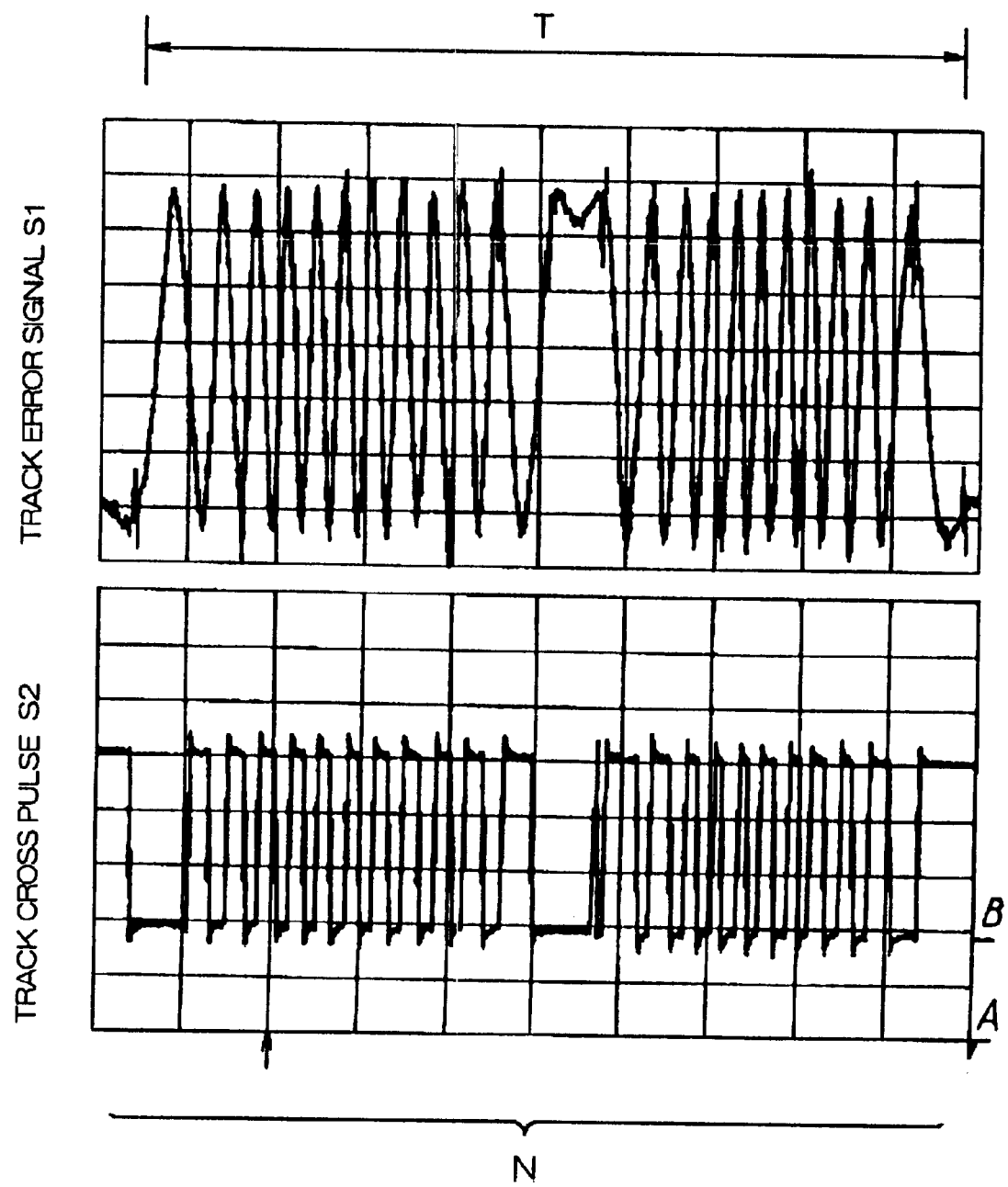
FIG. 3 illustrates waveforms of a track error signal S1 emitted from an optical head and a track cross pulse S2 emitted from a track cross generating circuit.

FIG. 3 illustrates waveforms of the track error signal S1 emitted from the optical head 4, and of the track cross pulse S2 emitted from the track cross generating circuit 11. A period of time necessary for the optical head 1 to rotate by 360 degrees is indicated with "T". It is understood that the N number of track cross pulses were observed within a single period T. This means that there is an eccentricity associated with the N number of the tracks 2. That is, an eccentricity Δx of a track is defined with the following equation.

$$\Delta x = N \times d$$

wherein N indicates a number of the track cross pulses S2 observed in a rotational period T of the spindle motor 3, and "d" indicates a pitch between adjacent tracks.

For instance, suppose the following conditions:
rotational period T=60 ms (which corresponds to 1,000 rpm);
the number N of the track cross pulses S2=120; and
pitch "d" between tracks=1.6 μs an eccentricity Δx of a track is calculated to be 192 μs. The relation d herein is detailed in Japanese Unexamined Patent Publication No. 62-189644 filed by the assignee.

FIG. 4 shows the experimentally obtained relation between an eccentricity Δx of a track and an allowable maximum rotational frequency of the spindle motor 3. It is understood that, when the eccentricity Δx is equal to 192 μs, it would be possible to stably draw a track in, even if a rotational frequency of the optical disc 1 is increased up to 4×S wherein S indicates a standard rotational frequency of the optical disc 1. For instance, if the standard rotational frequency of the optical disc 1 is 500 rpm, as mentioned earlier, a rotational frequency of the optical disc 1 can be increased up to 2,000 rpm (500×4=2,000).

If the spindle motor 3 rotates at a constant speed in a period T, the track cross pulse S2 may be started to measure at any track 2 of the optical disc 1. There would be produced an error ±D when the number of the track cross pulses S2 are measured in a period T. However, if the number of the track cross pulses S2 are measured in a period KT wherein K is a positive integer, it would be possible to decrease an error down to ±D/K.

Figure 5:
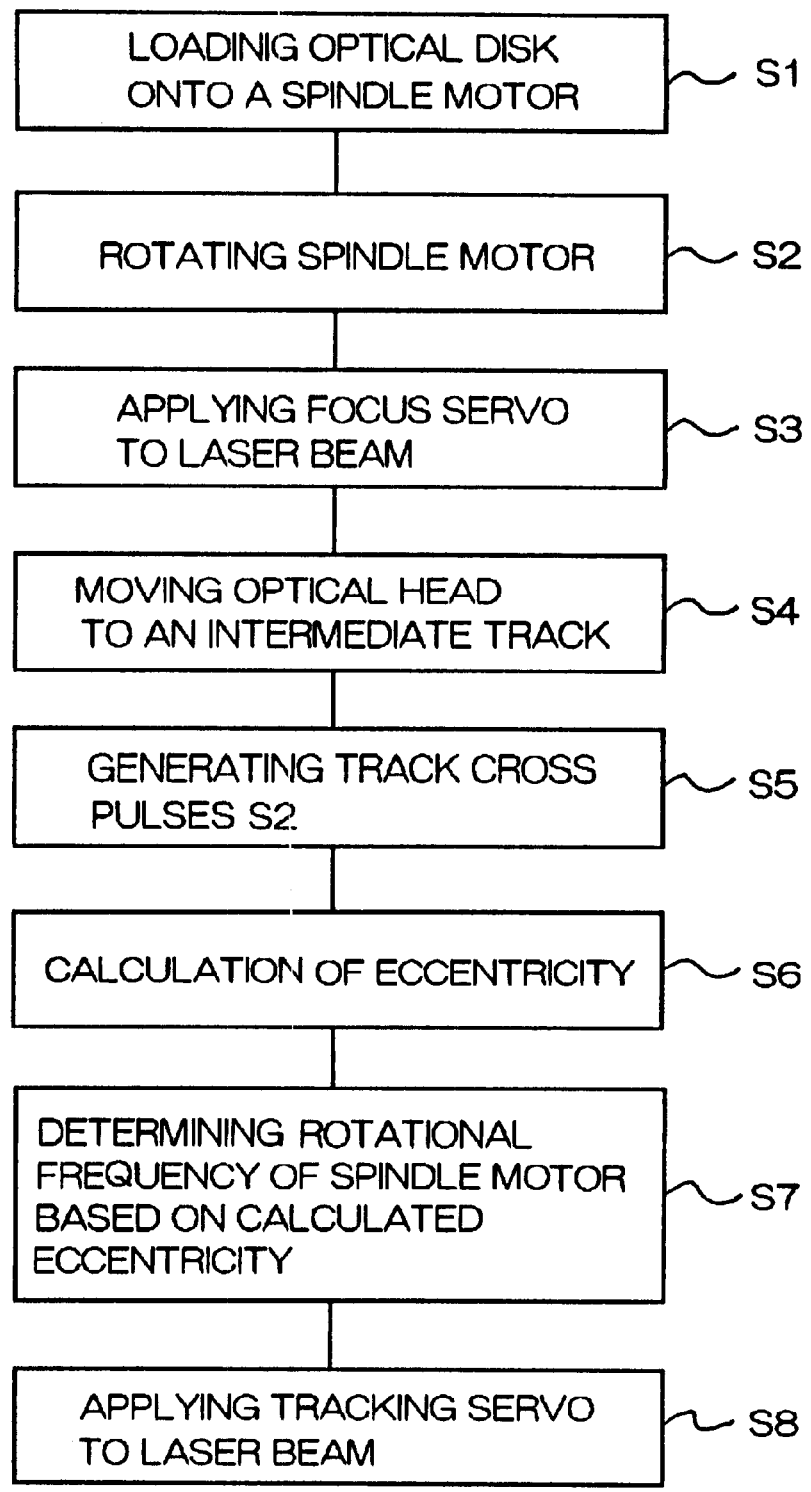
FIG. 5 is a flow chart of a method in accordance with the preferred embodiment of the present invention.

FIG. 5 is a flow chart illustrating steps of a method of compensating for an eccentricity of an optical disc, in accordance with the preferred embodiment of the present invention.

First, the optical disc 1 is loaded onto the spindle motor 3 in the step S1. Then, the spindle motor 3 is rotated at a predetermined rotational frequency such as 500 rpm in the step S2. For instance, if a standard rotational frequency of the optical disc 1 is 500 rpm, the predetermined rotational frequency is set to be 1,000 rpm.

Then, the controller 9 applies focus servo to the laser beam 7 in the step S3 without applying tracking servo to the laser beam 7. Then, the optical head 4 is moved to a track remote from innermost and outermost tracks of the optical disc 1 by a distance defined as a quotient, A/B, wherein A indicates an allowable eccentricity of the optical disc 1, and B indicates a track pitch of the optical disc 1.

Then, the optical head 4 receives the laser beam reflected from the optical disc 1, and emits the track error signals S1 to the track cross generating circuit 11. The track cross generating circuit 11 generates the track cross pulses S2 based on the received track error signals S1, and emits the thus generated track cross pulses S2 to the controller 9 in the step S5.

The controller 9 calculates an eccentricity of the optical disc 1 based on the received track cross pulses S2, and then, selects a suitable rotational frequency of the spindle motor 3 based on the thus calculated eccentricity of the optical disc 1. Then, the controller 9 emits the signal S4 indicative of the thus selected rotational frequency, to the spindle motor 3 to thereby rotate the optical disc 1 at the selected rotational frequency. Then, tracking servo is applied to the laser beam 7 for reading data out of and writing data into the optical disc 1.

Thus, the optical disc 1 is rotated at a rotational frequency determined in dependence on an eccentricity of the optical disc 1, ensuring enhancement of an average transfer rate for the long run.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-117019 filed on May 7, 1997 including specification, claims, drawings and summary is incorporated herein by reference in its entirety.

What is claimed is:

1. A method of compensating for an eccentricity of an optical disc, comprising:

loading an optical disc onto a spindle motor of an optical disc driver;

driving said spindle motor to thereby rotate said optical disc;

applying a focus servo to a laser beam which is emitted from an optical head and directed onto said optical disc without applying a tracking servo to said laser beam;

moving said optical head in a radial direction thereof onto an intermediate track between innermost and outermost tracks of said optical disc;

producing a track cross pulse signal in accordance with a track error signal transmitted from said optical head;

calculating an eccentricity of said optical disc based on said track cross pulse signal;

determining an allowable rotational frequency of said optical disc;

driving said spindle motor so that said optical disc is rotated at said allowable rotational frequency; and applying said tracking servo to said laser beam for reading data out of and writing data into said optical disc, wherein said allowable rotational frequency is based on a measured eccentricity and a standard rotational frequency for said optical disc driver, and wherein said intermediate track is located a certain distance from an innermost track and an outermost track, said certain distance comprising a number of tracks which is defined by a quotient, A/B, wherein A comprises an allowable eccentricity of said optical disc, and B comprises a track pitch of said optical disc.

2. A method of compensating for an eccentricity of an optical disc comprising:

rotating said optical disk at a predetermined speed in an optical disc driver;

applying a focus servo to a laser beam which is emitted from an optical head and directed onto said optical disc;

moving said optical head in a radial direction thereof onto an intermediate track between innermost and outermost tracks of said optical disc;

producing a track cross pulse signal based on a track error signal transmitted from said optical head;

calculating an eccentricity of said optical disc based on said track cross pulse signal;

determining an allowable rotational frequency of said optical disc; and rotating said optical disc at said allowable rotational frequency, wherein said allowable rotational frequency is based on a measured eccentricity and a standard rotational frequency for said optical disc driver, and wherein said intermediate track is located a certain distance from an innermost track and an outermost track, said certain distance comprising a number of tracks which is defined by a quotient, A/B, wherein A comprises an allowable eccentricity of said optical disc, and B comprises a track pitch of said optical disc.

3. The method according to claim 2, wherein in said applying said focus servo, said tracking servo is not applied to said laser beam.

4. The method according to claim 3, further comprising:

after said rotating said optical disc at said allowable rotational frequency, applying said tracking servo to said laser beam for reading data out of an writing data into said optical disc.

5. The method according to claim 2, wherein said eccentricity is calculated during one rotation of said optical disc.

6. The method according to claim 5, wherein said eccentricity is measured and said allowable rotational frequency is determined non-repetitively in a linear process.

7. The method according to claim 2, wherein said calculating an eccentricity is performed by a linear process which is free of repetition.

8. The method according to claim 2, wherein said allowable rotational frequency optimizes an average transfer rate for said optical disc.

9. A method of compensating for an eccentricity of an optical disc, comprising:

rotating said optical disc at a predetermined speed in an optical disc driver;

applying a focus servo to a laser beam which is emitted from an optical head and directed onto said optical disc;

moving said optical head in a radial direction thereof onto an intermediate track between innermost and outermost tracks of said optical disc;

producing a track cross pulse signal based on a track error signal transmitted from said optical head;

calculating an eccentricity of said optical disc based on said track cross pulse signal;

determining an allowable rotational frequency of said optical disc; and rotating said optical disc at said allowable rotational frequency, wherein said allowable rotational frequency comprises eight times a standard rotational frequency for said optical disc driver where said eccentricity is between 0 and 70 μm, six times a standard rotational frequency for said optical disc driver where said eccentricity is between 70 and 105 μm, four times a standard rotational frequency for said optical disc driver where said eccentricity is between 105 and 210 μm, two times a standard rotational frequency for said optical disc driver where said eccentricity is between 210 and 245 μm, and a standard rotational frequency for said optical disc driver where said eccentricity is greater than 245 μm.

10. A method of compensating for an eccentricity of an optical disc, comprising:

loading an optical disc onto a spindle motor of an optical disc driver;

moving an optical head to a location which is distant from an innermost track and an outermost track by a number of tracks which is defined by a quotient, A/B, wherein A comprises an allowable eccentricity of said optical disc, and B comprises a track pitch of said optical disc;

producing a track cross pulse signal based on a track error signal transmitted from said optical head;

calculating an eccentricity of said optical disc based on said track cross pulse signal; and determining an allowable rotational frequency of said optical disc based on a measured eccentricity and a standard rotational frequency for said optical disc driver.

11. The method according to claim 10, further comprising:

applying a focus servo to a laser beam which is emitted from an optical head and directed onto said optical disc.

12. The method according to claim 11, wherein in said applying said focus servo, said tracking servo is not applied to said laser beam.

13. The method according to claim 11, further comprising:

rotating said optical disc at said allowable rotational frequency; and applying said tracking servo to said laser beam for reading data out of and writing data into said optical disc.

* * * * *